United States Patent [19]

Moore

[11] Patent Number: 4,965,439

[45] Date of Patent: Oct. 23, 1990

[54] MICROCONTROLLER-CONTROLLED DEVICE FOR SURVEYING, RANGEFINDING AND TRAJECTORY COMPENSATION

[76] Inventor: Sidney D. Moore, 2173 N. Wilkes Ct., Claremont, Calif. 91711

[21] Appl. No.: 245,860

[22] Filed: Sep. 14, 1988

Related U.S. Application Data

[63] Continuation-in-part of Ser. No. 752,463, Jul. 5, 1985, Pat. No. 4,777,352, which is a continuation-in-part of Ser. No. 207,946, Nov. 18, 1980, Pat. No. 4,431,052.

[51] Int. Cl.$^5$ .................. G06F 15/58; F41G 3/06; G01C 3/20
[52] U.S. Cl. .................. 235/404; 89/41.17; 356/21; 356/252; 364/561
[58] Field of Search .............. 235/404; 364/516, 561; 356/4, 21, 252; 350/562, 566; 33/246, 247; 89/41.03, 41.17

[56] References Cited

U.S. PATENT DOCUMENTS

| | | | |
|---|---|---|---|
| 3,340,614 | 9/1967 | Leatherwood | 33/246 |
| 3,386,330 | 6/1968 | Burris et al. | 356/21 |
| 3,392,450 | 7/1968 | Herter et al. | 33/245 |
| 3,506,330 | 4/1970 | Allen | 33/247 |
| 3,684,376 | 8/1972 | Lessard | 356/21 |
| 3,743,818 | 7/1973 | Marasco et al. | 235/404 |
| 3,990,155 | 11/1976 | Akin, Jr. et al. | 33/247 |
| 4,020,739 | 5/1977 | Piotrowski et al. | 89/41.03 |
| 4,248,496 | 2/1981 | Akin, Jr. et al. | 350/562 |
| 4,263,719 | 4/1981 | Murdoch | 33/297 |
| 4,285,137 | 8/1981 | Jennie | 33/246 |
| 4,389,791 | 6/1983 | Ackerman | 33/246 |
| 4,403,421 | 9/1983 | Shepherd | 33/246 |
| 4,404,890 | 9/1983 | McAlpine | 356/252 |
| 4,531,052 | 7/1985 | Moore | 235/404 |
| 4,617,741 | 10/1986 | Bordeaux et al. | 33/241 |
| 4,695,161 | 9/1987 | Reed | 356/254 |
| 4,777,352 | 10/1988 | Moore | 235/404 |
| 4,787,739 | 11/1988 | Gregory | 356/4 |
| 4,806,007 | 2/1989 | Bindon | 33/246 X |

OTHER PUBLICATIONS

"Pushbutton Ballistics," by Edgar J. Young, Rifle 81 Magazine, May–Jun. 1982.
Leutz: Design of Automatic Machinery, Textbook Van Nostrand Reinhold Co. New York, 1985, pp. 312/313 of interest.

*Primary Examiner*—Felix D. Gruber
*Attorney, Agent, or Firm*—Christie, Parker & Hale

[57] ABSTRACT

A microcomputer-controlled optical instrument comprises an objective lens, an ocular lens, and an erector lens assembly mounted to pivot between the objective lens and the ocular lens. A first image plane is defined by the objective lens, and a second plane of focus is located between the ocular lens and the erector lens assembly. A microcontroller is carried on the instrument, and a spanning reference is in focus on the first image plane. The erector lens assembly pivots by appropriate adjustments so the image of the spanning reference can be viewed on the first image plane in relation to a reference indicator focused on the second image plane, to thereby adjust the apparent spacing between the spanning reference and the reference indicator in response to the user's viewing the target through the instrument spanning the size of the target. A first control signal is produced and sent to the microcontroller to represent the pre-set size of the target. A second control signal is produced and sent to the microcontroller to represent the set spacing between the spanning reference and the reference indicator. A range-measuring system is responsive to the first and second control signals for automatically producing a third control signal representative of the range from the instrument to the target as determined from the set spacing and the pre-selected size of the target. Once the actual range measurement has been determined by the microcontroller, this value is used to compute a holdover value for use in aiming a firearm to compensate for the normal trajectory of a projectile fired at the target over the measured range.

18 Claims, 5 Drawing Sheets

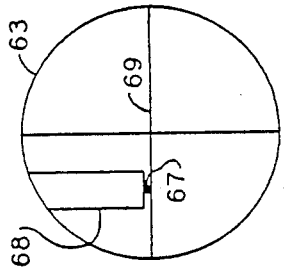
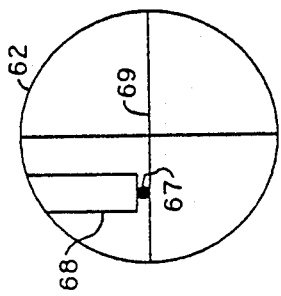
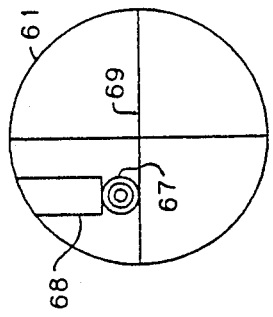
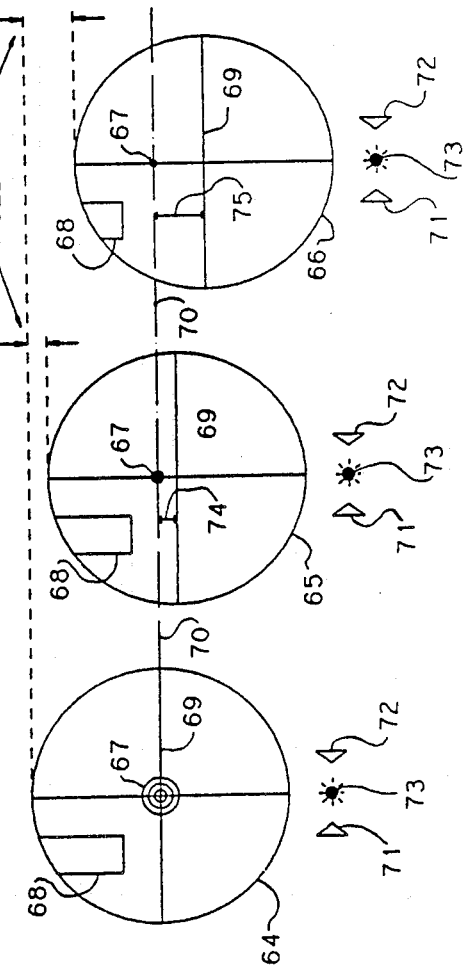

MICROCONTROLLER-CONTROLLED DEVICE FOR SURVEYING, RANGEFINDING AND TRAJECTORY COMPENSATION

CROSS-REFERENCE

This is a continuation-in-part of U.S. Pat. No. 4,777,352, issued on Oct. 11, 1988, which is a continuation-in-part of U.S. Pat. No. 4,431,052, both of which are incorporated herein by this reference.

FIELD OF THE INVENTION

This invention relates to optical devices for surveying, rangefinding, and the like, and is particularly useful in telescopes and their use in aiming firearms. More particularly, the invention provides a rangefinding and trajectory-compensating riflescope which requires only a simple manipulation of a control knob and switch to accomplish various rangefinding and trajectory compensation functions.

BACKGROUND OF THE INVENTION

Although the present invention is applicable to other optical devices, the invention will be described below with respect to a riflescope embodiment. It is also to be understood that reference to the front of the apparatus means the objective lens end, while the rear of the apparatus is understood as being the ocular lens end.

Since the advent of firearms, ways and means have been sought to accurately aim these devices at targets. Evolving from simple notch-and-bead arrangements, the optical riflescope has proved to be the most effective device in fulfilling this task.

Riflescopes have been commercially available for many years and have remained largely unchanged since their introduction. These instruments comprise two basic types. The simplest form comprises a body tube, objective and ocular lenses disposed at essentially opposite ends of the tube, and an erector lens assembly in the body tube in the space between the objective and ocular lenses. Without the erector optics, the image formed by the objective lens would be seen inverted as in celestial telescopes. The inversion of images of celestial objects is of no consequence, but telescopes adapted for use in the aiming of firearms require the inclusion of erector optics to provide an image which appears upright. The erector optics are mounted within a secondary tube which is mounted within the main body tube of the riflescope. The erector optics tube is usually controllably pivotable by means of adjustment screws for the positional fine adjustment of the target image relative to an essentially stationary sighting reference. This reference usually consists of a pair of aiming crosshairs or a reticle disposed in the riflescope either at the focal plane of the objective, in front of the erector lens assembly, or at the rear plane of focus shared by the erector and the ocular optical elements.

In a second and somewhat more complex form of riflescope, the erector optics are also controllably movable along the optical axis within their tube in such a manner as to cause the focal length of the optical system to vary to provide an image of variable size. A ring external of the body tube is manipulated by the shooter to alter, at will, the size of the image formed by the riflescope within limits afforded by the design and structure of the particular device. This operation is typically called "zooming", and a range from three-to nine-power is common. At three-power, the image formed by the device is three times life-size, while at nine power it is nine times life-size.

The body tube, or housing of the riflescope, is mounted to the firearm. Once mounted, the riflescope is "zeroed." This operation establishes a precise relationship between the bore line of the firearm and the operator's visual line of sight through the riflescope. This adjustment is facilitated by the previously mentioned screw means constituting a horizontal (windage) adjustment and a vertical (elevation) adjustment. "Zeroing" is done in relation to an impact point at a known distance down range. For instance, a firearm may be "zeroed" so that the aiming reference, the reticle or crosshair intersection, is aligned with a point one hundred yards distant and is coincident with the placement or location of the projectile at that range. Once established, the alignment is permanent, unless the rigors of field use necessitate realignment by further zeroing.

In riflescopes of basic construction, the range to targets must be compensated for entirely by the shooter who first estimates a target's range and then imposes a degree of "holdover" estimated to compensate for projectile drop at that distance. However, few shooters become adept at estimating range and in compensating properly for bullet drop. In the field, variations in terrain, air density, and elevation can cause even the best of shooters to misjudge target range a significant percentage of the time, resulting in their often being well off the mark when firing. Shooters who are expert at such judgment are able to attain accuracy with only one or two specific cartridges and rifles with which they have become familiar by practice. With increasing target distance, the expert shooter aims ever higher in estimated increments of the target's image size: quarter height of target over, half height over, full height over, and so forth. This judgment is based directly on the size of the target image in the riflescope and, stated in the simplest possible way, the shooter knows that as down range distance increases, target image size decreases.

Limited static and dynamic means have evolved for range determination and aiming compensation based on these experiences.

DESCRIPTION OF THE PRIOR ART

Static devices such as those disclosed in U.S. Pat. Nos. 3,392,450 to Herter et al. and 4,263,719 to Murdoch feature a special reticle upon which is engraved a plurality of circles of different diameters, or spaced lines, representing the "standard" eighteen inch (450 mm.) withers-to-brisket measurement of a common mule deer at a specific distance or range. Additionally, each circle or pair of lines is vertically displaced below the vertically centered horizontal crosshair an amount estimated to compensate for average bullet drop at a specific range. Once the shooter selects a circle or pair of lines which most nearly matches the image size of the target, he aligns its associated horizontal line with the target and discharges the firearm.

Another static device is disclosed in U.S. Pat. No. 4,285,137 to Jennie. The principle embodied in this device is essentially similar to that of the previously discussed U.S. Pat. Nos. 3,392,450 and 4,263,719, with the exception that only two sighting planes are provided. The primary sighting plane corresponds to the zero crossing point of the trajectory for dead-on aiming, while the secondary plane provides the shooter with a single reference for aiming holdover for use at greater target ranges.

Two major disadvantages are inherent in the static means exemplified by these prior art devices. First, the compensating aiming marks or planes are limited to a single set, necessitating use of only one cartridge, the trajectory of which must be exactly matched to the reticle's single set of horizontal aiming marks. The difficulty is that to have even one set of static aiming marks accurately relate to a given bullet's trajectory would require the riflescope manufacturer's selection of a single popular cartridge for which the riflescope would be custom-designed. This method also wrongly presupposes that all rifles fire cartridges identically. Cartridges other than the one for which the riflescope is designed could not be used with accuracy since their trajectory characteristics would differ from the fixed set of aiming holdover marks.

A second major disadvantage of the static means taught by U.S. Pat. Nos. 3,392,450, 4,263,719 and 4,285,137, is that for any range other than the several increments provided by the static reticle spacing, the shooter must estimate an aiming point between pairs of indicators. This has the further disadvantage of depriving the shooter of a horizontal crosshair reference to aid in holding aim upon the target.

A further disadvantage of the prior art static means is the cluttering of the field of view of the riflescope. The many circles, lines, or sighting planes lead to confusion during critical or stressful aiming situations, as when time for aiming is limited.

These several limitations make accuracy with these static devices uncertain and often impossible.

The prior art dynamic means of rangefinding utilizing the relationship between range and the apparent size of the optical image of the target provides a more satisfactory and versatile solution. Examples of these devices are disclosed in U.S. Pat. Nos. 3,340,614 to Leatherwood, 3,506,330 to Allen, 3,684,376 to Lessard, 3,386,330 to Burris, 4,248,496 to Akin, Jr. et al., 4,389,791 to Ackerman, and indirectly, by U.S. Pat. No. 3,990,155 to Akin, Jr. et al. The device in U.S. Pat. No. 3,340,614 has a physical means of moving a reference wire in relation to a stationary wire to frame the target. This adjustment further communicates with elevation adjustment means to alter the line of sight in general compensation of target range and projectile drop. U.S. Pat. No. 4,389,791 differs in that the apparently movable crosshair is actually fixedly mounted forward of the erector lens assembly and is made to appear to move up and down by the pivoting of the erector optics tube when an external ring is manipulated by the shooter. The second stationary wire is fixedly mounted rearward of the erector optics tube so that pivotal movement of the tube has no effect on its apparent position. A major disadvantage of the device in U.S. Pat. No. 4,389,791 is its limitation to use in fixed-power riflescopes since the image of the forward wire would vary in width with changes in the zoom setting. Such zoom changes would also destroy the geometrical relationship between the two wires which is essential to the rangefinding function of the device.

In the several devices of the other patents referred to above, variable focal length optics are used in the erector lens system disposed between the objective and ocular lenses. Thus, power of magnification may be altered, usually by means of an adjustment ring, to vary the apparent size of the target image. This operation, as has been pointed out, is commonly termed "zooming." A fixed pair of spaced, parallel horizontal wires or etched lines are disposed on the ocular side of the variable optics, and are therefore unaffected by changes in zooming magnification. The zooming ring is turned until the target image is either reduced or enlarged to fit the spacing of the pair of parallel wires or etched lines. Since the target image size is a function of target distance, the position of the zooming ring will vary accordingly. Thus, a range distance scale and an index mark may be provided in association with the zooming knob or ring to indicate target range. Once the target image is properly framed, the operator reads the range distance opposite the index mark.

In the device of U.S. Pat. No. 3,506,330, changes in the magnification of the target image are directly communicated to mechanical means to automatically alter the elevation adjustment of the line of sight of the riflescope to compensate for projectile drop in a general way.

In U.S. Pat. No. 3,684,376, no provision is made to relate the determined range distance to changes in elevation adjustment for proper holdover. The assumption is that the shooter has memorized the published bullet drop tables for the cartridge in use and can mentally estimate required holdover. This latter patent also teaches a movable second reference wire, but the advantage such movement provides is limited to adjustments in compensation for variations in target size only; and, once set, the horizontal reference wires remain static relative to one another during all rangefinding operations. The devices of this patent, as with the others having fixed framing reference wires, require a zooming type embodiment and will not function in the more accurate fixed power type of riflescope. There is also no aiming compensation system in the devices of this patent.

Of the several prior art devices actually produced commercially, one of the most satisfactorily conceived and executed is a Bushnell riflescope combining two devices disclosed in U.S. Pat. Nos. 3,990,155 and 4,248,496, assigned to Bausch and Lomb, Inc. The device of the '155 patent is an elevation adjusting knob assembly coupled to the erector optics tube of an associated riflescope which changes the vertical positioning of the crosshairs relative to the target image. Indicia on the adjustment knob relate to target distance. A clever and novel feature of this device is its interchangeable knob capability. Each of several knobs bears a different scale of indicia relating to the characteristics of a particular cartridge trajectory. One such knob is left unmarked for individual calibration for special applications in the field by the shooter. This feature is useful to those who hand-load their own cartridges, since the trajectories of such loads are unique. Combined in the same riflescope is the device of the '496 patent wherein a prism is used in combination with zooming optical elements and parallel horizontal target framing reticle wires. These provide a readout in the riflescope's field of view of the range to the target, the image of which is framed by the horizontal framing wires. Upon completion of target framing, the operator sets the elevation compensating knob to the indicated yardage figure to adjust the aiming crosshairs for proper holdover. The shooter may accomplish this without moving the riflescope away from his eye.

The described Bushnell riflescope has distinct advantages over other devices of the prior art. However, as with all other active devices of the prior art, it is a requirement of the Bushnell design that the shooter relinquish control of the rifle with one hand to operate the rangefinding device. It is a further disadvantage of this version of the combined device that the shooter must move a hand away from holding the firearm to adjust the elevation compensating knob for the proper range. After setting the elevation compensating knob, it is necessary to relocate the target in the riflescope's field of view. The time required for the several operative steps in a riflescope of this design will frequently result in missed opportunities since the target of interest will seldom be so accommodating as to remain in one place sufficiently long.

A disadvantage inherent in all devices of the prior art which provide elevation compensation for projectile drop at various ranges is that the means by which this is accomplished is permanently established by gears, threaded members, and/or cams which do not compensate for the many variables which affect projectile trajectories during operation.

The factors which markedly affect bullet trajectories are well known in the art of firearms and fire control and much study of ballistics data has resulted in considerable knowledge relating to the understanding and prediction of projectile flight curves and general performance. Over the years many formulas, equations, and methods of calculation (such as the well known Siacci method) have evolved which relate to every aspect of projectile performance. Manufacturers of cartridges apply this accumulated knowledge in exhaustive tests to establish parameters for the use of their products. The resulting extensive information is published in the form of tables which typically show projectile drop in inches for range increments of one hundred yards, or meters, and at various muzzle velocities.

A relatively new tool in the study of popular ballistics is the computer and many, if not all, manufacturers now generate their ballistics tables entirely by computer. When subsequently compared to actual cartridge performance, these computer-generated tables have proved remarkably accurate.

With the increasing availability of computers and programmable calculators, interest in ballistics calculation has become widespread, even among interested lay individuals and shooters. An example of this interest from recent popular literature, included herein by reference, is the article Pushbutton Ballistics, by Edgar J. Young, in Rifle 81 Magazine, May-June, 1982. This article includes a computer program for a programmable pocket calculator which can generate ballistics tables containing everything a shooter needs to know about trajectories and flight performance.

The use of computers for accurate military fire control is old. Examples of such applications are the devices disclosed by U.S. Pat. No. 3,743,818 to Marasco, et al., 4,020,739 to Piotrowski, et al., and 4,404,890 to McAlpine. In all prior art military fire control devices an elaborate laser range finder is assumed. Such a means of range determination is out of the question in sport shooting applications because of high cost, bulk, weight, and power requirements.

There are inventions in the prior art which take advantage of the fact that the objective lens of a riflescope forms a first image plane on the optical axis immediately in front of the erector optics tube. U.S. Pat. No. 4,389,791 to Ackerman teaches the use of a secondary horizontal wire on this first image plane to use as a target spanning reference together with a primary horizontal wire. This device is elegantly simple but its application is limited to broad categorizations of ballistic performance. And, as with other devices of the prior art, the device must be removed from the aiming position in order to be set for aiming compensation. As previously discussed, this is highly undesirable.

U.S. Pat. No. 4,403,421 to Shepherd also teaches use of a sighting reference on the first focal plane of a riflescope. In this subject matter the secondary reference at the first focal plane is utilized merely as a means of insuring that the user's eye is centered on the primary reticle so as to eliminate parallax, a condition which occurs with changes in the distance to the target — the greater the distance, the greater the parallax. However, parallax can be effectively eliminated entirely simply by providing focusing capability in the riflescope. A focusing objective or erector lens cell has become the method of choice in modern sniperscopes and long range targetscopes such as used by silhouette and benchrest shooters. A feature of this device is that the secondary reference may be adjusted out of the field of view when desired. This feature is inconsequential to the present invention.

SUMMARY OF THE INVENTION

The present invention provides an improved microcontroller-operated device for use in surveying, rangefinding and trajectory compensation.

Briefly, one embodiment of the invention comprises an optical instrument through which a target of preselected size can be viewed. The instrument includes an objective lens, an ocular lens, and an erector lens assembly mounted in a secondary housing to pivot between the objective lens and the ocular lens. A first image plane of focus defined by the objective lens is located between the objective lens and the erector lens assembly. A second plane of focus is located between the ocular lens and the erector lens assembly. A microcontroller carried on the optical instrument provides means for signal processing to produce a range-measuring system. A spanning reference is in focus on the first image plane. Means are provided to pivot the erector lens assembly to scan the combined image of the spanning reference and the target on the first image plane in relation to a reference indicator, a horizontal crosshair on the second plane of focus, to thereby adjust the apparent spacing between the spanning reference and the reference indicator in response to the user's viewing the target through the instrument and spanning the size of the target. A first control signal is produced and sent to the microprocessor to represent the pre-selected size of the target. A second control signal is produced and sent to the microcontroller to represent the set spacing between the spanning reference and the reference indicator. Range-measuring means in the microcontroller are responsive to the control signal to automatically produce a third control signal representative of the range from the instrument to the target as determined by the set spacing and pre-selected size of the target.

In one form of the invention, the erector lens assembly pivots by means of a control knob external to the optical instrument, and an encoder on the control knob senses its movement and inputs measurement of its movement to the microcontroller for use in calculating the range measurement.

In a further embodiment, once the known range measurement has been calculated by the microcontroller, a switch is activated to input the known range value, after which the microcontroller calculates a holdover value for use in aiming compensation and outputs a compensation signal to aid the shooter in adjusting the device for aiming the firearm so as to compensate for the trajectory of the projectile at the known range value.

The invention has the following objectives:

(1) an improved microcontroller-operated scope which may be used for rangefinding and is particularly useful in surveying instruments, rangefinding devices, and trajectory-compensating aiming devices for firearms;

(2) an improved microcontroller-operated rangefinding control for riflescopes;

(3) a rangefinding device which can be set to accurately determine the range to any size object;

(4) a rangefinding and trajectory-compensating riflescope which requires only the simple manipulation of a control knob and switch to accomplish various rangefinding functions to provide full control of the device by the shooter; and (5) an electronic aiming compensation means for riflescopes.

These and other aspects of the invention will be more fully understood by referring to the following detailed description and the accompanying drawings.

BRIEF DESCRIPTION OF THE DRAWINGS

FIG. 4(a) is a sight picture of a target spanned at 100 yards.

FIG. 4(b) is a sight picture of a target spanned at 300 yards.

FIG. 4(c) is a sight picture of a target spanned at 500 yards.

FIG. 4(a') is a sight picture of a target in "dead on" aim at the sighted-in range of 100 yards.

FIG. 4(b') is a sight picture showing holdover distance 74, required for proper aim at the target at 300 yards.

FIG. 4(c') is a sight picture showing the holdover distance 75, required for proper aim at the target at 500 yards.

DETAILED DESCRIPTION

Figure 1:
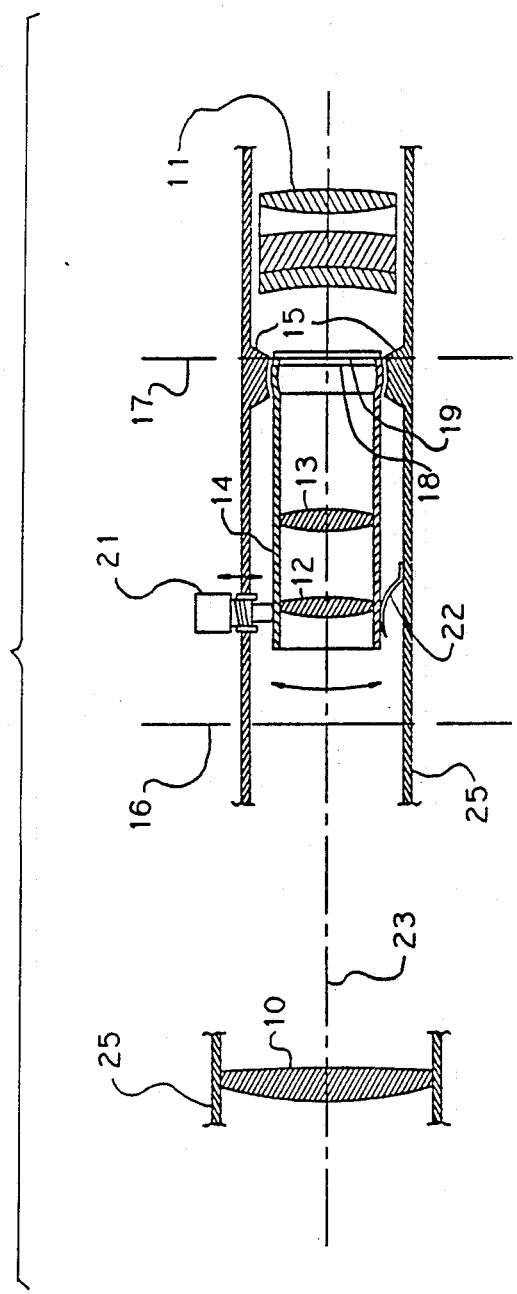
FIG. 1 is a schematic diagram illustrating the principal components of a conventional riflescope.

Referring to the drawings, FIG. 1 schematically illustrates essential components of a conventional telescopic riflescope contained in and on a housing 25. The housing 25 is shown in cutaway view for clarity. The optical components included in a typical riflescope are an objective lens 10, an ocular lens cell 11, and first and second erector lenses 12 and 13 carried in an erector optics tube, or secondary housing 14. Support bosses 15 mount an end portion of the erector optics tube 14 to maintain the tube in a fixed, though pivotable, position within the riflescope housing. The objective lens 10 forms an inverted image of a target on a first image plane 16 located in the housing between the objective lens and the erector lens assembly. A second image plane 17 is formed by the erector lenses 12 and 13 at the ocular end of the erector optics tube 14. Attached to the ocular end of the erector optics tube 14, and situated upon the second image plane 17 is a reticle frame 18 carrying upon it a sighting reference, or reticle comprising a vertical crosshair 19 and a horizontal crosshair (not shown). The crosshair points of intersection fall essentially centrally upon an optical axis 23 of the riflescope. The objective lens 10 and ocular lens cell 11 are also aligned axially on the optical axis 23 through the body 25 of the riflescope.

The erector lenses 12 and 13 and the ocular lens cell 11 together form a low power microscope, or magnifier, which "views" the first image plane 16. A threaded adjustment post 21 communicates to the outside of the riflescope body 25 for purposes of adjusting the relative positions of an image formed on the first image plane 16 in combination with an image of the reticle crosshairs 19 and 20. A spring 22 biases the erector optics tube 14 into positive contact with the end of a threaded adjustment post 21. A second threaded adjustment post is used in riflescopes of this type to adjust horizontal positioning of the image/reticle combination, but this adjustment has no role in describing and understanding the present invention and is, therefore, omitted for simplicity.

Figure 2:
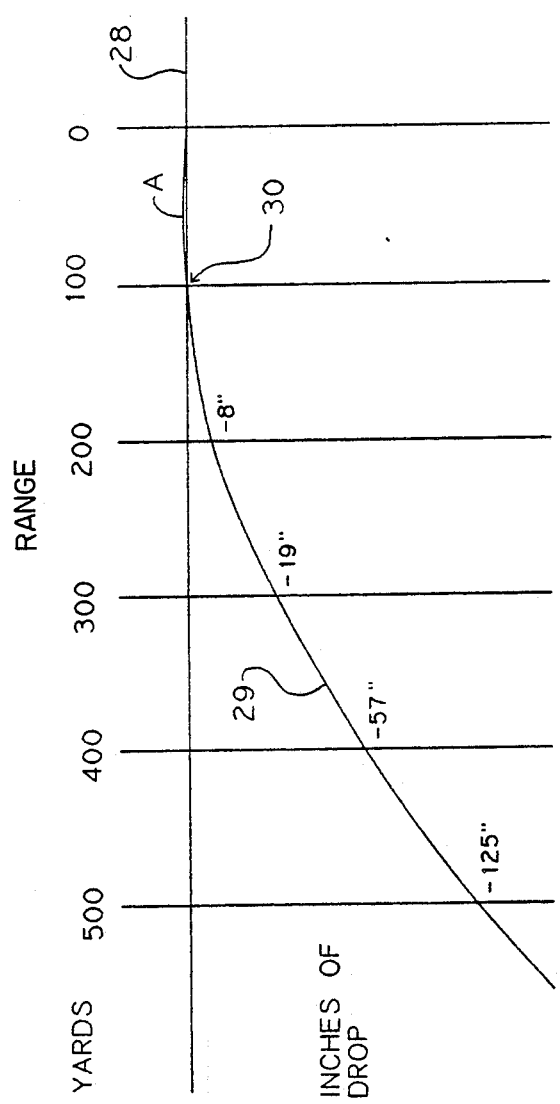
FIG. 2 is a diagram showing the relationship between the trajectory of a projectile and the line-of-sight of a riflescope.

FIG. 2 illustrates the difficulty in obtaining accurate aim at a distant target caused by the deviation between a straight line-of-sight 28 and a curved projectile trajectory 29. The increasing deviation between the two is illustrated at range increments of 100 yards with typical increments of bullet drop indicated by minus inches.

Typically, after mounting the riflescope upon a firearm, a shooter adjusts the relationship between the two so the image of the crosshairs will fall precisely upon the point of impact of a bullet fired by the rifle at a chosen range. The chosen range is commonly 100 or 200 yards. Thus, the first portion of projectile travel will be above the line-of-sight 28 as shown at A in FIG. 2. In the example illustrated in FIG. 2, the chosen distance for coincidence of line-of-sight 28 and the trajectory 29 is 100 yards. This point of coincidence is shown as the zero crossing point 30 — the projectile is neither above nor below line-of-sight 28 — that is, it will be directly "on target" at 100 yards. This calibration setting is known as "zeroing" the riflescope/rifle combination. The zero crossing point 30 is the only relationship between the bullet's trajectory 29 and line-of-sight 28 quantitatively known to the shooter using riflescopes of conventional design. When using these scopes for targets at greater ranges than the calibrated zero range, the shooter must estimate how much higher to aim the firearm to bring the projectile up into alignment with the line-of-sight to the target. This over aiming is called "holdover" and must accurately match the target's range to the amount of bullet drop for that range. Another way to conceptualize the conditions necessary for accurate aiming at distant targets is to consider that the shooter is, in effect, mentally re-zeroing the equipment at the new distance with each shot, pivoting the firearm ever higher with increasing target range.

Figure 3:
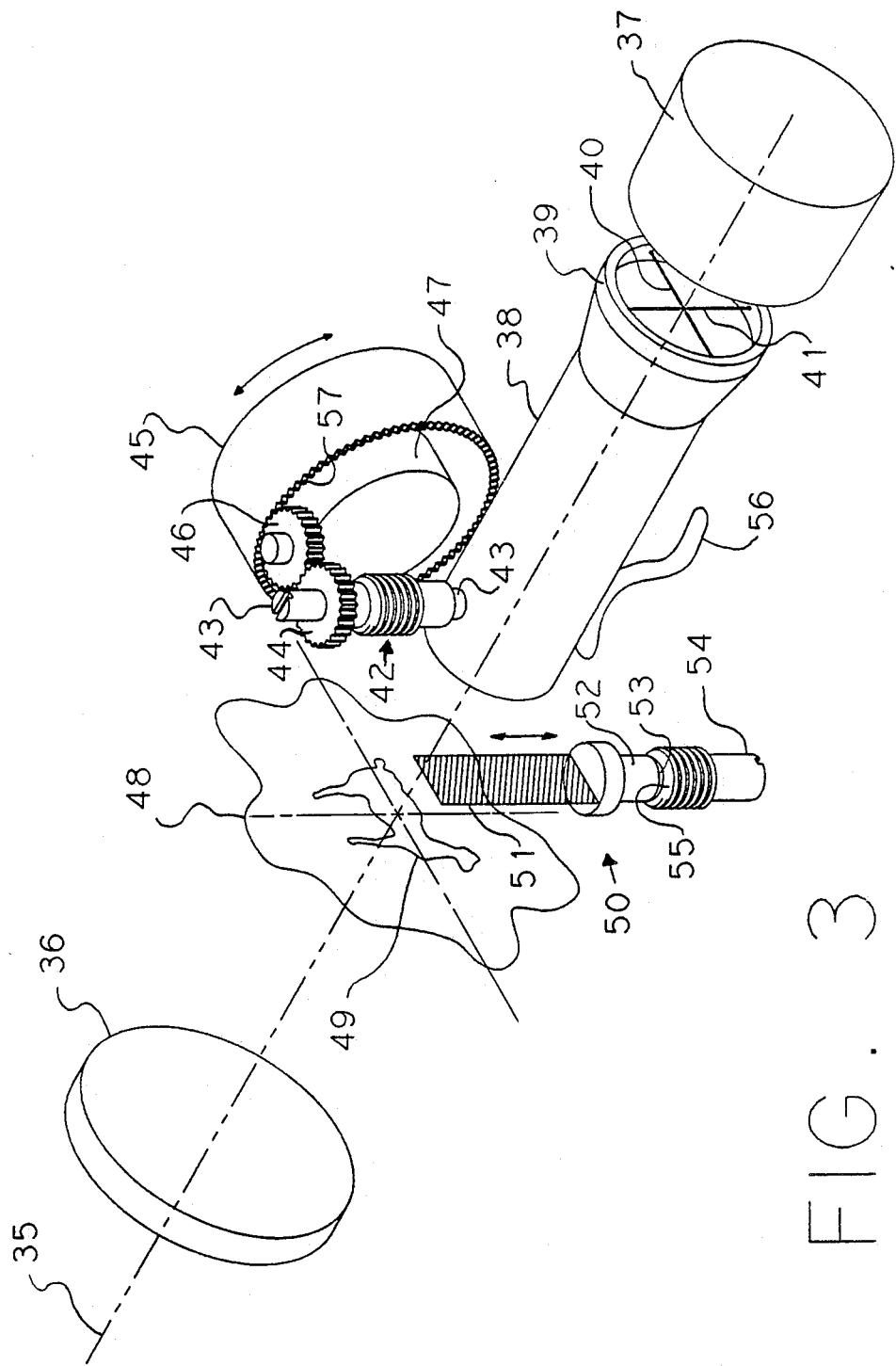
FIG. 3 is a semi-schematic perspective view illustrating a riflescope according to principles of this invention.

The guesswork involved in aiming firearms at distant targets is removed by the present invention. FIG. 3 illustrates components of a riflescope which include an objective lens 36, an ocular lens cell 37, an erector optics tube 38, a reticle frame 39, a horizontal crosshair 40, and a vertical crosshair 41. These are essentially identical to those components found in conventional scopes and are shown in their relative positions along the optical axis 35 of the scope.

Adjustment means in the form of vertical adjustment assembly 42 has two adjustments in one assembly for calibrating the apparatus. A zero adjusting screw 43 threads through a central bore of the vertical adjusting assembly 42. The bottom of the adjusting screw 43 engages the upper surface of an erector optics tube 38 near the objective lens end of the tube, between the first image plane and the second image plane. As in conventional scopes, a spring 56 biases the erector optics tube 38 into positive engagement with the vertical adjusting assembly 42. The thread fit of the zero adjusting screw 43 inside the bore of the vertical adjusting assembly 42 is designed to be very close so as to provide considerable resistance against accidental relative rotation. This ensures that, once adjusted, the rotational alignment between the screw 43 and assembly 42 will remain unchanged when the vertical adjusting assembly 42 is subsequently rotated via an integral gear 44 which forms a fixed part of the assembly 42.

Zero adjusting screw 43 communicates through the body (not shown) of the riflescope and is accessible to operator manipulation from the exterior of the riflescope during the zeroing operation, previously discussed. Rotation of the zero adjusting screw 43 causes the erector optics tube 38 to pivot to adjust the objective image of the target on the first image plane relative to the horizontal and vertical crosshairs so that the line-of-sight coincides with the trajectory at, say, 100 yards. The crosshairs are held captive on the second image plane of the scope. Once the zeroing operation is completed, further adjustment of the zero adjusting screw 43 will not be necessary for operation of the present invention.

Subsequent to the zeroing operation, only rotational adjustments of an external control knob 45 are communicated to vertical adjusting assembly 42 by means of the engagement of an integral ring gear 57 with an intermediate gear 46 and, thence, engagement of the intermediate gear 46 with the gear 44 on the vertical adjusting assembly 42. These several parts constitute the drive means by which manual adjustments of the control knob 45 are communicated to the erector lens cell optics.

Rotational adjustments of the external control knob 45 are also communicated directly to a shaft encoder 47 through its direct interconnection with the control knob. The shaft encoder 47 tracks rotational adjustments to the external control knob 45 and conveys corresponding control signals to a microcontroller circuit (see FIG. 5) for signal processing to carry out rangefinding and aiming compensation functions of this invention.

Prior to performing the zeroing adjustment, the external control knob 45 and shaft encoder 47 are set to a rotational position recognized as a zero reference position by associated microcontroller circuitry (to be described with reference to FIG. 5). The zero adjusting screw 43 is rotated to set the initial zero setting, as described above, and the control knob 45 is held stationary during rotation of the screw 43, to hold the zero reference of the encoder. During subsequent use, by following the signal output by the shaft encoder 47, the microcontroller always "knows" the positions of the adjustments, and as a result, accurately tracks the vertical displacement of the erector optics tube with respect to the positional setting previously determined during the manual zeroing operation.

A controllably movable indicator means is provided in the form of a target image spanning reference assembly 50 for calibrating the apparatus for a known target size at a known calibration distance. A spanning reference adjustment screw 54 positions the spanning reference assembly 50 with respect to the target image and prevailing conditions (to be fully described with reference to FIG. 4). Target image spanning reference assembly 50 includes a target image spanning reference 51, which may be an opaque, translucent, or completely transparent element, except for a visible portion for viewing along with an image of a target. The reference 51 is mounted for vertical movement only, and is coincident with a first image plane 48 for viewing therewith in sharp focus. An inverted image 49 of a target is focused by the objective lens on the first image plane 48 on the optical axis 35 of the instrument. The reference 51 is located on the first image plane with respect to the target image. The reference assembly 50 further comprises a support member 52 having a face 53 for contacting a face 55 of the adjustment screw 54 for adjustment perpendicularly to the optical axis, only, of the spanning reference assembly 50.

The vertical position of the spanning reference assembly 50 is manually adjusted by the setting of the adjustment screw 54 which communicates through the body (not shown) of the riflescope for access by the operator. The adjustment screw 54 is initially rotated to set the zero reference position of the spanning reference 51. This reference position is set by spanning the distance between the reference 51 and the horizontal crosshair 40 to match an image of a target of a known size located at a known range.

FIG. 4 illustrates a series of sight pictures showing a target image and its varying relationship to the overall image at different ranges in both a rangefinding and an aiming compensation mode. In the upper half of FIG. 4, the rangefinding, or target image spanning mode of operation is illustrated. The sight picture 61 in FIG. 4(a) shows the image of an eighteen inch diameter at a range of 100 yards. The target image 67 is being properly spanned by a target spanning reference image 68 and a horizontal crosshair image 69. The objective lens has focused the target image 67 on the first image plane where the spanning reference 68 is located. The erector lens assembly focuses a second aerial image of the target and spanning reference on the second image plane, and the erector lens assembly has been adjusted to cause the combined image of the horizontal crosshair and spanning reference to span the target image. The firearm/scope combination has previously been zeroed at 100 yards so that the bullet impacts in line with the horizontal crosshair image 69. Once zeroing is initially established, the operator positions the horizontal crosshair image 69 to be tangent with the bottom edge of the eighteen inch target image 67, as shown, and then adjusts the spanning reference adjusting screw 54 (FIG. 3) until the spanning reference image 68 moved to a position tangent with the upper extreme of the target image 67. This provides the zero spanning reference setting described above.

At this point, thanks to the output of shaft encoder 47 (FIG. 3), all initial mechanical variables are known to the microcontroller circuitry, and its memory will track all subsequent mechanical adjustments to provide accurate rangefinding and aiming compensation functions.

These functions are input by rotation of the control knob 45.

In FIG. 4(b), the sight picture 62 illustrates proper spanning of an eighteen inch diameter target image 67 in which the target is at a range of 300 yards. The sight picture 63 in FIG. 4(c) shows proper spanning of the same target image 67 in which the target is at a range of 500 yards. From these views the change in image size with change in distance (range) can be appreciated. It can also be appreciated from these views that spanning of the target image between the spanning reference image 68 and the horizontal crosshair image 69 provides the microcontroller circuitry with unique positioning data with variations in target range. These unique positions are instantaneously translated by the microcontroller circuitry into actual range measurements (image size being inversely proportional to range) for subsequent use in the calculation of an aiming compensation value.

The memory in the microcontroller initially contains a data input related to target size (span) at a known range. The spanning reference adjustment screw 54 is initially adjusted to move the spanning reference 51 to an initial position which spans a target of known size at a known range. By a data input signal indicating to the microcontroller that an eighteen inch target has been spanned, for example, the microcontroller can calculate the range corresponding to the preset target size, based on the distance spanned on the first image plane between the spanning reference and the horizontal crosshair. Thereafter, any target of the preset size can be spanned by turning the control knob 45. This action adjusts the spacing between the horizontal crosshair and the spanning reference 68. When the target is correctly spanned, the resulting setting of the encoder 47 is then converted by the microcontroller into a corresponding range measurement.

Figure 5:
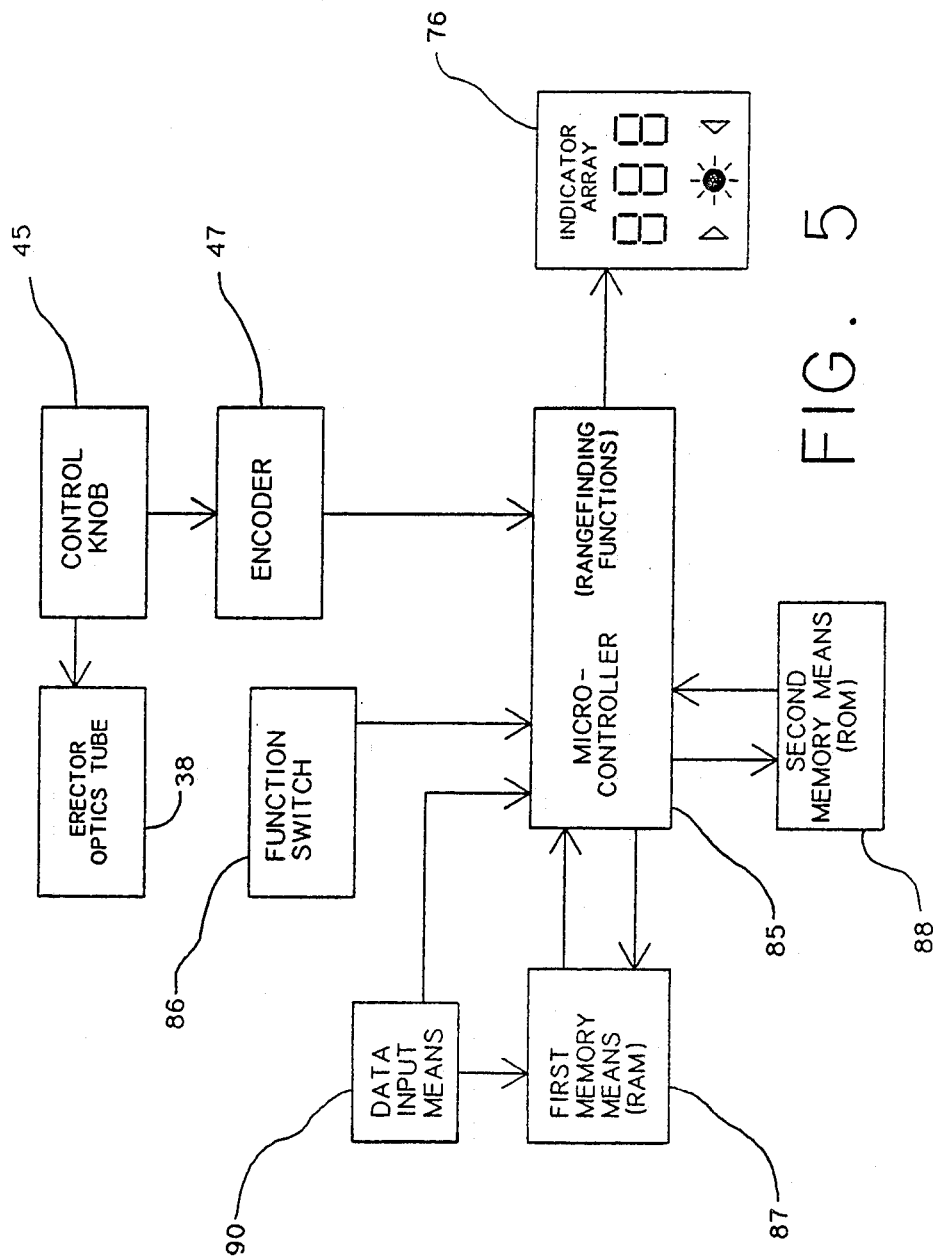
FIG. 5 is a functional block diagram illustrating the relationships of various electronic and mechanical components of the present invention.

In one embodiment, these range measurements also may be numerically displayed in the field of view of the scope in a conventional seven-segment digital display as shown in FIG. 5.

In the lower half of FIG. 4, the three sight pictures each correspond to the sight picture immediately above it. These views in the lower half of FIG. 4 illustrate the relationships between the horizontal aiming crosshair 69 and the position of the target image 67 after the microcontroller has generated the proper holdover value based on ballistic data previously stored in its memory and distance to the target as determined during the previous rangefinding phase. Once the operator is satisfied with the suitability of the spanning adjustment, the microcontroller is signalled by a manually operated function switch to indicate that the rangefinding phase is completed. The measured range value is input to the memory of the microcontroller. The aiming compensation mode is then carried out. The operator adjusts the control knob 45 (FIG. 3) to match a null signal output by the microcontroller for indicating proper aiming compensation. (Details of how these operations are accomplished are explained below with respect to FIG. 5.) Simultaneously, the microcontroller circuitry generates another control signal which, depending upon the direction control knob 45 must be rotated, activates either a first direction indicator 71 or a second direction indicator 72. The direction indicators eliminate all guesswork for the proper setting of the control knob 45 to the null point. The indicators 71 and 72 are shaped like arrowheads to indicate the direction of rotation required.

Once the control knob 45 is set at the null point, a correct setting indicator 73 is activated to signal the operator to stop adjusting the control knob 45. At this point, the image of the target on the first plane of focus has been moved by a holdover distance 74 from the horizontal crosshairs 69. The holdover distance is directly proportional to the amount of bullet drop calculated by the microcontroller for the now known range to the target. The only further acts required of the shooter are to move the firearm to place the riflescope crosshairs' intersection on the point on the target the bullet should strike and then to pull the trigger. The amount by which the firearm is moved is directly proportional to the calculated holdover value. Details of the functioning of the indicators 71, 72 and 73 are explained below with respect to FIG. 5.

The aiming compensation mode sight picture 64 in FIG. 4(a') illustrates proper zero holdover for the eighteen inch diameter target image 67. The sight picture 65 in FIG. 4(b') illustrates the offset position calculated by the microcontroller for proper holdover for a target at 300 yards. In this instance, the shooter will raise the aim of the firearm until the horizontal crosshair image 69 is coincident with the phantom zero reference line 70. (The zero reference line 70 is shown for illustration purposes only and is to be understood not to exist in the actual sight picture.) Properly compensated aim is attained merely by raising the firearm the amount illustrated by the holdover 74, and the horizontal crosshair image 69 is precisely aligned upon the target image 67 as shown in the previous sight picture 64 for the zero compensation setting.

Similarly, a sight picture 66 in FIG. 4(c') illustrates the additional holdover 75 required by a target at 500 yards. The same operations are performed to produce the sight picture 66 as were performed with respect to the sight pictures 64 and 65. And, as always, once the microcontroller has activated the correct setting indicator 73, for indicating proper setting of the adjustments, the shooter takes dead aim, positioning the crosshairs' intersection exactly where he wishes the bullet to impact the target. All guesswork for achieving proper holdover is eliminated.

FIG. 5 shows a block diagram of a microcontroller 85 and its associated circuitry which are physically mounted on the riflescope. A data input means 90, the shaft encoder 47, and a function switch 86 provide input signals to the microcontroller 85 and a programmable first memory means 87 (random access memory). Initial ballistic parameters are entered via the data input means 90, which may take the form of a conventional keypad, and are stored in a non-volatile memory retention portion of the programmable first memory means 87. An example of the information sent to the microcontroller 85 via the data input means 90 is the muzzle velocity of a particular cartridge/firearm combination in use. The importance of this information for proper calculation of aiming compensation by the microcontroller 85 for accurate aim is understood when realizing that every firearm is unique as to the efficiency with which it fires a bullet over its considerable range. In any case, the velocity of the bullet as it leaves the barrel is an important factor in calculating its down-range performance. Muzzle velocity is only one of several data values which can be input into the programmable first memory means 87 to affect calculations performed by the microcontroller 85 in calculating aiming compensation. Other ballistic data which can be input are identified in my U.S. Pat. No. 4,531,052, incorporated herein by reference.

The shaft encoder 47 produces an up/down pulse train which the microcontroller 85 follows and interprets with respect to target image size/target distance, and aiming holdover. A two-position function switch 86 signals the microcontroller 85 to indicate whether the operator is performing the rangefinding or aiming compensation functions.

The random access memory 87 is connected to the microcontroller 85 to provide a storage area for temporary field data such as muzzle velocity, target size, calculated target range, and the like, which affect the various operations of the invention. In combination, the programmable first memory means 87 and a second memory means 88 (read-only-memory) cooperate with the microcontroller 85, based on permanent and temporary data and instructions, to establish a mathematically accurate ballistic curve equivalent to the performance path of a bullet, or other projectile, fired by the firearm.

In addition, the second memory means 88 sends to the microcontroller 85 the necessary permanent data and instructions required for logical interpretation of the several variable input values and operations to be performed by the microcontroller 85.

As previously discussed with respect to FIG. 3, the control knob 45 communicates with the erector optics tube 38 to alter the position with which the erector optics "views" the first image plane 48 (FIG. 3) for the various operations of the invention in its target image-spanning and aiming compensation functions.

Signals produced by a comparator function programmed into microcontroller 85 activate one of three indicators 71, 72, or 73, of indicator array 94, visible to the operator and situated at the second image plane 17 (FIG. 1) just outside the field of view. The indicators 71 and 72 indicate to the operator which direction the control knob 45 must be turned to seek a null setting of the shaft encoder 47 (FIG. 3), to activate the central indicator 73 for indicating proper setting of the holdover compensation. Of course, the setting of the shaft encoder 47 is directly related to the setting of the erector optics tube 38 (FIG. 3) so that the relationships among the various variables of the invention are properly maintained.

Indicator array 94 also provides selectable digital readout 76 for numeric presentation of range settings viewable by the operator.

The null signal level is affected by the prevailing output value of the signal from the shaft encoder 47 which is factored into the calculations performed by the microcontroller 85 for accurate determination of aiming compensation.

To better understand the functioning of the present invention, it is helpful to visualize an imaginary ballistic curve which relates to the variety of data initially input by the operator. Subsequently, in the rangefinding mode, the microcontroller 85 can be thought of as slewing to and fro along this pre-existing curve in response to changes induced in the pulse train output by the shaft encoder 47, from adjustment of the control knob 45. The microcontroller 85 and its attendant circuitry are accurately tracking the changes in the rangefinding adjustment and, upon receiving the signal from the function switch 86 that halts the rangefinding mode and commences the aiming compensation mode locking in on a specific point on the ballistic curve. From this data, the amount of holdover necessary relative to the range to the target is determined.

The present invention has the advantage of using existing components of a conventional riflescope in a combination which produces an effective and inexpensive rangefinding and aiming compensation scope. The spanning reference on the first plane of focus, coincident with the focused image of the target from the objective lens produces these advantages. The erector optics are simply adjustable by the control knob to adjust the combined images of the spanning references and the horizontal crosshair for spanning the target image on the second plane of focus. This provides, in combination with the image of the target and the spanning reference, a precise rangefinding and aiming compensation scope. Moreover, these settings are made without requiring the shooter to move the firearm and scope during sighting, spanning, aiming compensation and shooting.

While the above description of the invention has been limited to a manually operated embodiment, it should be appreciated that a stepper motor, or the like, can be utilized in a fashion similar to that described in my U.S. Pat. No. 4,772,352 incorporated herein by reference. It should also be appreciated that the novel rangefinding features of the invention may be utilized without inclusion of the aiming compensation mode in applications limited to range measurement only such as are found in surveying and navigation.

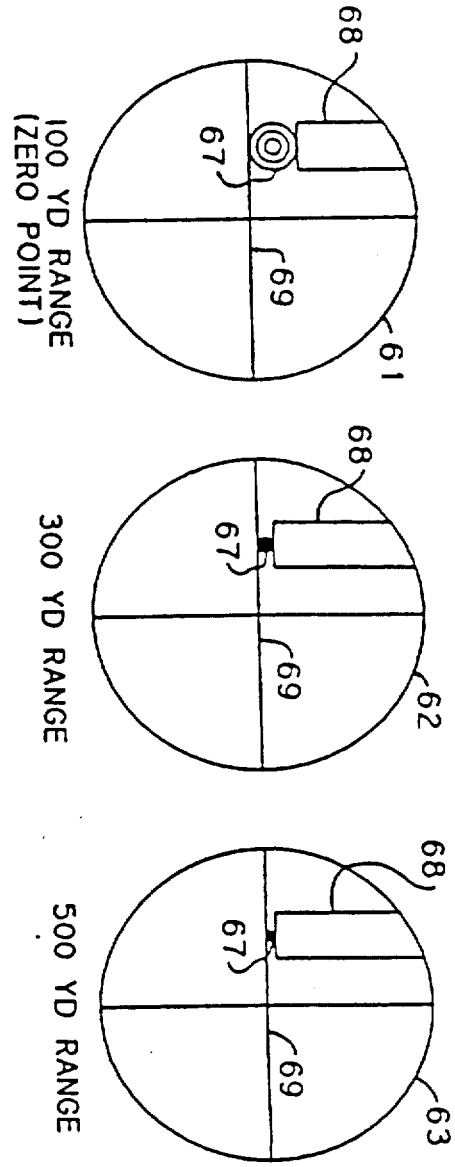
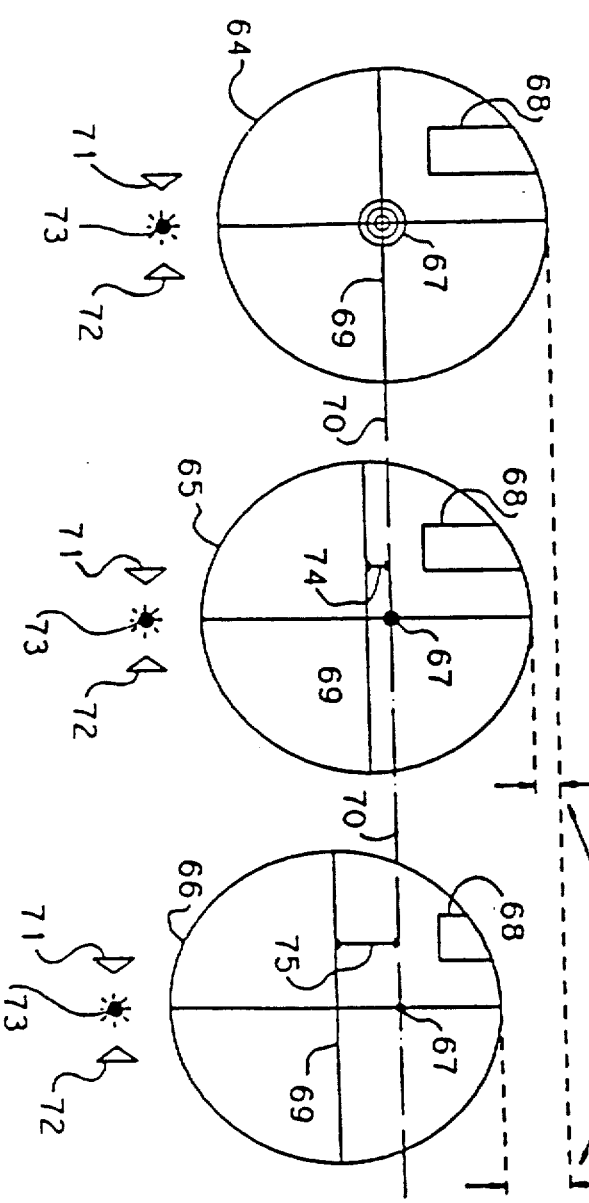

What is claimed is:

1. An optical apparatus for use in rangefinding and the aiming of firearms for determining the distance to an object of interest of known or estimable size, the apparatus having a housing defining an optical axis therethrough and supporting objective and ocular lenses spaced apart and aligned along the optical axis, the objective lens defining a first plane of focus within the housing upon which an image of the object is focused for viewing by an operator, the housing pivotably supporting a secondary housing containing an image erecting lens, the secondary housing disposed essentially upon the optical axis for controlled pivotable movement thereon only, the image erecting lens and the ocular lens defining a second plane of focus therebetween for viewing by an operator simultaneously with the image of an object formed by the objective lens on the first plane of focus, and a sighting reference disposed within the housing on the second plane of focus for viewing by an operator simultaneously with the image of the object, the apparatus comprising:

a microcontroller programmed for performing rangefinding operations and calculations related thereto and for receiving and producing a variety of input and output control signals related to the rangefinding operations and calculations performed by the microcontroller, including first memory means for storage of permanent instructions and data pertinent to the rangefinding operations and calculations made thereby, and second memory means for storage of temporary instructions and data pertaining to the rangefinding operations and calculations made thereby;

controllably movable indicator means movably mounted within the housing and controllable by an operator and arranged so that an image of the movable indicator means is focused for viewing by an operator in relation to the image of the sighting reference and the image of an object of known or estimable size for spanning an image of an object;

drive means for selectably pivoting the secondary housing to controllably alter the relative positions of the combined images of the movable indicator means and an object of known or estimable size with respect to the image of the sighting reference;

positional transducer means associated with the drive means and responsive to variations in the position thereof and connected to the microcontroller for conveying to the microcontroller an indicator position signal relating to the position of the secondary housing, the secondary housing position signal being utilized by the microcontroller to affect subsequent rangefinding operations and calculations made thereby;

input means, selectively controllable by the operator, for producing input control signals for use by the microcontroller for affecting rangefinding operations and calculations performed thereby; and compensation means associated with the microcontroller for producing a signal in response to a setting of the positional transducer means and in response to data in the first and second memory means, the signal being utilized by the operator for producing a corrective second controlled movement of the pivotable secondary housing.

2. An electronic range measuring apparatus comprising:

a viewing device through which a target of preselected size can be viewed;

means for displaying an upper target image spanning reference and a lower target image spanning reference in the viewing device, the spanning references having a controllably variable space therebetween;

calibration means for producing a first space between the upper and lower target image spanning references representative of the size of a preselected target at a known distance;

adjustment means for changing relative spacing between the upper and lower target image spanning references in response to an input from a manually operated control to produce a second space between said target image spanning references in response to the user's visually viewing the target image through the viewing device to thereby span the size of the target image;

means for producing an electrical control signal representative of the changes in the relative spacing between the upper and lower target image spanning references; and range measuring means responsive to the electrical control signal for automatically producing a second electrical control signal representative of the range from the viewing device to the target as determined from the set relative spacing between said target image spanning references.

3. Apparatus according to claim 2, and further comprising:

a digital display associated with the range measuring means and responsive to the second electrical control signal for displaying a digital readout of the range measurement.

4. Apparatus according to claim 2 in which the target image is focused on a first image plane and at least one of the spanning references is movable on the same image plane.

5. An aiming compensating system for a weapon which fires a projectile, comprising:

an optical device for mounting on the weapon and through which a target can be viewed;

a microcontroller for mounting on the weapon;

ballistic data input means for producing a first control signal representative of data characteristic of the trajectory of the projectile fired by the weapon;

range measuring means for producing a second control signal representative of the distance from the weapon to the target, said distance being determined in response to relative spacing between first and second spanning references viewable on a plane of focus on which the image of the target appears;

an aiming compensation indicator within the field of view of the optical device; and computing means within the microcontroller for receiving the first and second control signals and, in response thereto, producing a third control signal for controlling the aiming compensation indicator as a function of the previously determined distance and ballistic information.

6. An optical instrument through which a target of preselected size can be viewed, comprising:

an objective lens;

an ocular lens;

an erector lens mounted to pivot between the objective lens and the ocular lens;

a first image plane of focus defined by the objective lens;

a second plane of focus between the ocular lens and the erector lens;

a microcontroller carried on the optical instrument;

a spanning reference viewable on the first image plane;

means for pivoting the erector lens to view the images of the spanning reference and target on the first image plane in relation to a reference indicator on the second image plane viewable on the first image plane to thereby adjust the apparent spacing between the spanning reference and the reference indicator in response to the user's viewing the target through the instrument to span the size of the target;

means for producing a first control signal sent to the microcontroller representative of the preselected size of the target;

means for producing a second control signal sent to the microcontroller representative of the set spacing between the spanning reference and the reference indicator; and range measuring means responsive to the second control signal for automatically producing a third control signal representative of the range from the instrument to the target as determined from the set spacing and said preselected size of the target.

7. Apparatus according to claim 6 in which the spanning reference is mechanically movable relative to the image of the reference indicator to preset said apparent spacing to represent the preselected size of the target.

8. Apparatus according to claim 6 in which the means for pivoting the erector lens comprises a control knob external to the optical instrument and an encoder for sensing movement of the control knob and inputting a measurement of its movement to the microcontroller for use in calculating the range measurement.

9. Apparatus according to claim 8 in which the microcontroller includes means for calculating a holdover value in response to the calculated range measurement, and means for indicating the holdover value as an indication of further movement of the control knob necessary to display aiming compensation in relation to the target on the first image plane.

10. Apparatus according to claim 9 in which the means for indicating aiming compensation comprises indicators visible on the first or second plane of focus to indicate the direction in which the control knob is to be moved to obtain the calculated holdover value.

11. Apparatus according to claim 10 in which the display means display the holdover value as a measured distance on the first plane of focus.

12. Apparatus according to claim 6 in which the microcontroller includes means for calculating a holdover value in response to the calculated range measurement, and means for indicating the calculated holdover value.

13. A range measuring apparatus comprising:
a viewing device through which an object of preselected size may be viewed;
means for displaying image spanning references in the viewing device, the spanning references being selectably controllable to span the size of the image of the object therebetween;
means for producing a first electrical control signal representative of changes in the setting of the spanning references; and
range measuring means responsive to the first electrical control signal for automatically producing a second electrical control signal representative of the range from the viewing device to the object as determined from the setting of said image spanning references.

14. Apparatus according to claim 13, and further comprising:
a digital display associated with the range measuring means and responsive to the second electrical control signal for displaying a digital readout of the range measurement.

15. Apparatus according to claim 13, and further comprising:
adjustment means for producing a first setting of the spanning references representative of the size of a preselected object of known size at a known distance for calibrating the apparatus.

16. A range measuring system comprising:
an optical apparatus for viewing an object of known, or estimable, size for use in rangefinding to determine the distance of the object;
a microcontroller programmed to perform mathematical operations and calculations pertinent to rangefinding operations and to produce and receive electrical signals relating thereto;
variable spanning reference means within a field of view of the optical apparatus for spanning the image of the object to produce a variable spanning reference indication of the size of the image;
means for communicating the variable spanning reference indication to the microcontroller for rangefinding operations; and
range readout means connected to the microcontroller to display a numeric indication of the range to the object in response to said rangefinding operations.

17. An optical instrument for viewing an object of preselected size at an unknown distance, comprising:
an objective lens;
an ocular lens;
an image plane within the instrument defined by the lenses;
a microcontroller carried on the optical instrument;
a spanning reference viewable on the image plane;
an indicator viewable on the image plane along with the spanning reference for spanning therewith the size of the image of the object; and
range measuring means associated with the microcontroller, the spanning reference, and the indicator to produce a range measurement representative of the distance from the instrument to the object.

18. Apparatus according to claim 17 and further comprising:
digital readout means for displaying the range measurement for viewing by an operator.

* * * * *

UNITED STATES PATENT AND TRADEMARK OFFICE
CERTIFICATE OF CORRECTION

PATENT NO. : 4,965,439

DATED : October 23, 1990

INVENTOR(S) : Sidney D. Moore

It is certified that error appears in the above-identified patent and that said Letters Patent is hereby corrected as shown below:

In the Drawings:
The Drawing Sheet, consisting of FIGS. 4 (a) - 4 (c) and FIGS. 4 (a') - 4 (c') should be deleted and substitute therefor the attached sheet.

FIG. 4(a), change "400 YD RANGE" to -- 100 YD RANGE --.

On the title page:

item (76): References Cited, OTHER PUBLICATIONS, change "Leutz" to -- Lentz --.

Column 14, line 25, change "Patent No. 4,772,352" to -- Patent No. 4,777,352 --.

Signed and Sealed this

Eighth Day of June, 1993

Attest:

MICHAEL K. KIRK

Attesting Officer

Acting Commissioner of Patents and Trademarks